No. 731,832. PATENTED JUNE 23, 1903.
L. R. ALBERGER.
CONDENSER SYSTEM.
APPLICATION FILED NOV. 28, 1902.
NO MODEL. 2 SHEETS—SHEET 1.
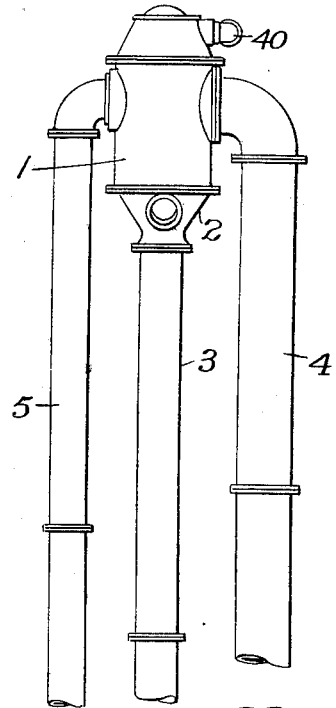
Fig. 1.
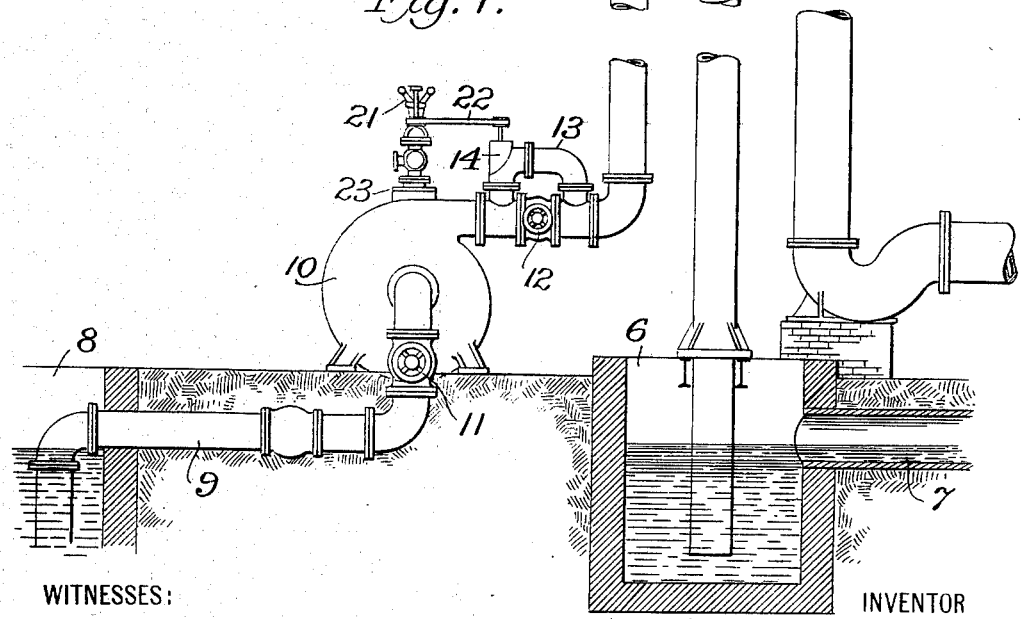
WITNESSES:
James P. Duhamel.
A. E. Samuels.
INVENTOR
Louis R. Alberger
BY
Fred C. Tasker
ATTORNEY No. 731,832. PATENTED JUNE 23, 1903.
L. R. ALBERGER.
CONDENSER SYSTEM.
APPLICATION FILED NOV. 28, 1902.
NO MODEL. 2 SHEETS—SHEET 2.
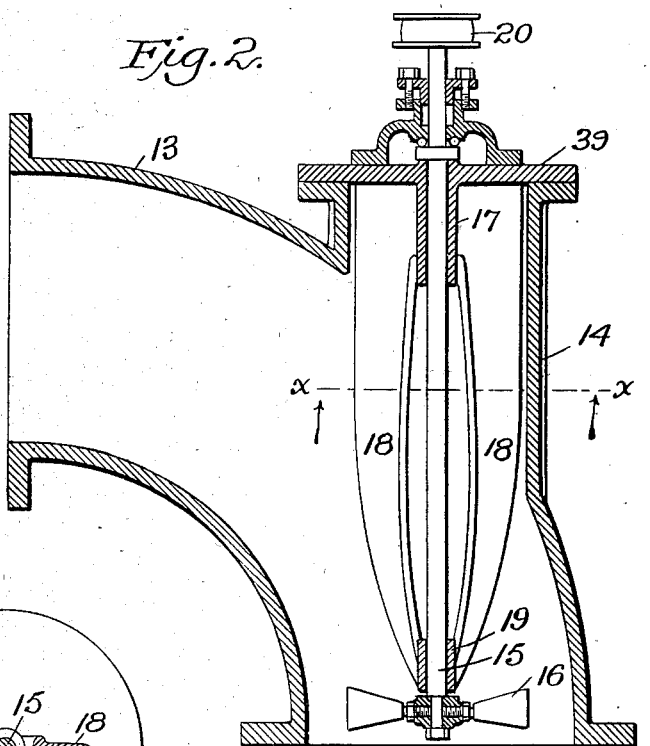
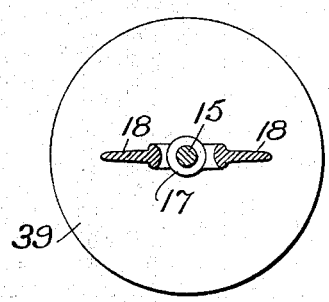
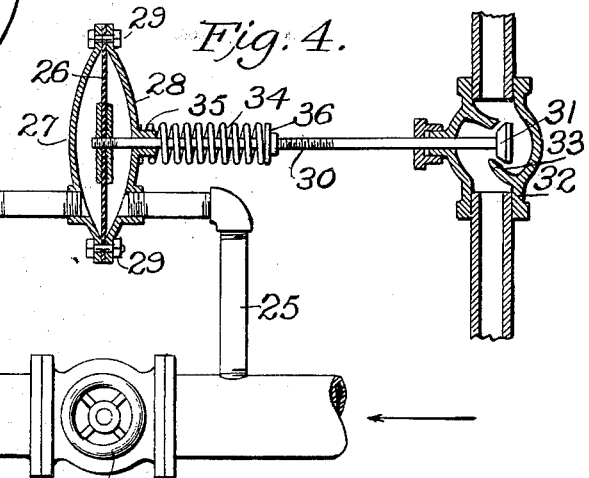
WITNESSES:
James F. Duhamel.
A. E. Samuels.
INVENTOR
Louis R. Alberger.
BY
Fred E. Tasker.
ATTORNEY No. 731,832. Patented June 23, 1903.

UNITED STATES PATENT OFFICE.

LOUIS R. ALBERGER, OF GREENWICH, CONNECTICUT, ASSIGNOR TO ALBERGER CONDENSER COMPANY, OF NEW YORK, N. Y., A CORPORATION OF NEW YORK.

CONDENSER SYSTEM.

SPECIFICATION forming part of Letters Patent No. 731,832, dated June 23, 1903.

Application filed November 28, 1902. Serial No. 132,981. (No model.)

*To all whom it may concern:*

Be it known that I, LOUIS R. ALBERGER, a citizen of the United States of America, and a resident of Greenwich, county of Fairfield, and State of Connecticut, have invented certain new and useful Improvements in Condenser Systems, of which the following is a specification.

This invention relates to a condenser system in which the condenser is of the elevated or barometric type and in which the vacuum in the condenser assists the flow of water thereto, there being arranged in combination with the elevated condenser one or more centrifugal pumps to deliver the water to such a point that the vacuum in the condenser will lift the water the remainder of the distance to which it is required to be lifted. One objection to the successful employment of centrifugal pumps for this purpose has been due to the fact that when said pumps are discharging the water under running conditions a falling off in the assistance of the vacuum immediately causes a decrease in the flow of the water, which shortly results in the shutting down of the condenser, it being impracticable to manually change the speed of the motor or engine driving the pump so as to maintain the flow of a constant quantity of water. Such being the case it becomes important to devise means for automatically varying the speed of the pump by changing the speed of the engine or motor driving it, this change being in correspondence with the change in the velocity of the water passing to the condenser. The object, of course, is to maintain a constant predetermined velocity and consequently a constant quantity of water supplied to the condenser under varying assistance of the vacuum from zero assistance to full assistance and under other changes of head, such as rise and fall of the level of the water-supply from which the pump is drawing the water.

In the annexed drawings, illustrating my invention, Figure 1 is a front elevation of an elevated condenser construction provided with my present improved means for automatically changing the speed of the motor to maintain a constant flow of water to the condenser. Fig. 2 is an enlarged sectional detail view showing a propeller arranged in combination with the condensing-water pipe to be acted upon by the flow. Fig. 3 is a cross-section on the line $x\ x$ of Fig. 2. Fig. 4 is a detail sectional plan view representing another form of mechanism whereby the flow of the water automatically changes the speed of the motor.

Like numerals of reference denote like parts throughout the different figures.

In order to illustrate the practical application of my invention, I have delineated in the drawings one form or type of elevated condenser, giving the same simply by way of example, with no intention of being restricted thereto, but reserving the liberty of applying the invention to any kind of condenser with which it is found serviceable. In this particular condenser, 1 denotes the main condensing-chamber, having the conical lower portion 2, below which extends the tail-pipe 3, that enters the hot-well 6, having an overflow-pipe 7.

4 indicates the pipe for conveying exhaust-steam to the main condensing-chamber 1, and 5 represents the condensing-water pipe which supplies the injection-water to the main condensing-chamber 1, the point at which pipe 5 enters chamber 1 being preferably substantially opposite to the point where the exhaust-steam pipe 4 delivers its steam to the chamber 1.

When an air-pump is used with this condenser, it will be preferably connected therewith by means of a pipe 40, leading to the top of the chamber 1.

Many different forms of mechanism may be devised for combination with a condenser in such a way that the velocity of the flow of the water through the condensing-water-supply pipe, as 5, will automatically regulate or control the speed of the pumping apparatus, to the end that a flow of a constant quantity of water may be maintained whatever assistance is given to such flow by the vacuum in the condenser. In the drawings I have delineated two forms of mechanism as examples merely in order to clearly illustrate how the principles of my present improvements may be operatively applied. One form is shown in Figs. 1, 2, and 3 and the other in Fig. 4. I will now proceed to describe them in detail, prefacing such description with the statement that it must be understood that the device may be located anywhere in the suction or discharge pipe of the centrifugal pump or even in the tail-pipe of the condenser, provided all the water passing to or from the condenser will affect it, or it may be located in a by-pass on one of such pipes or elsewhere, so that instead of being affected by the whole quantity of water it may be affected only by a portion thereof, the idea being to locate the device so that it will be influenced by the flow of the water, the result of which will be, as I shall presently describe, to vary the speed of the pumping apparatus in correspondence with the change in the velocity of the flow, so that a practically-constant quantity of water may be supplied to the condenser.

10 denotes a centrifugal or like pump drawing its water from its supply 8 through its suction-inlet 9, which is preferably provided with a gate-valve 11. This centrifugal pump is arranged to deliver or discharge into the condensing-water pipe 5, which will usually be provided with a gate-valve 12 to regulate the volume of water passing through it. Pump 10 may be driven by any suitable kind of motor or engine—steam, electric, or other kind—and in the drawings I have simply indicated in brief outline a steam-engine 23, having a ball-governor 21.

In the form of controlling device shown in Figs. 1, 2, and 3 a propeller having fans or blades is utilized as the agent to be affected by the flow of injection-water for the purpose of controlling the speed of the motor that actuates the pumping apparatus. Suppose, for example, that the propeller be located in a by-pass on the condensing-water pipe 5, as shown in Fig. 1. This by-pass may consist of the pipe 13, connected to the pipe 5 on one side of the gate-valve 12 and formed with a propeller-containing chamber 14, which is attached at the other end of the by-pass to the pipe 5 on the opposite side of the gate-valve 12. The propeller consists of a series of fans or blades 16, fastened on the end of a vertical shaft 15, mounted revolubly in a bearing 19 at the lower end of the skeleton arms 18, projecting downwardly from the top 39 of chamber 14 and mounted also in the bearing 17 on top 39, which shaft 15 projects through the top 39 of the chamber 14 and is furnished with a pulley 20, which connects, by a belt or other means 22, to the governor 21 of the steam-engine 23 or which may of course be connected to the controlling-rheostat of an electric motor or to any other engine or driver that may be used. Obviously the location of the blades 16 is such that they will be affected by the current of water flowing from the pump 10 through the condensing-water pipe 5. When the parts are properly adjusted, any increase in the flow of water due to the greater assistance of the vacuum in the condenser or otherwise will cause a higher speed of rotation of the propeller, and likewise of the centrifugal governor 21 of the steam-engine, which higher speed, acting upon the weights of the governor of the engine, will shut off the steam to a greater or less extent, and thus slow down the engine more or less, as well as slowing down the pumping apparatus to a point where practically the normal quantity of water will be the amount supplied. On the other hand, if the assistance of the vacuum should decrease or cease entirely the flow of the water will then become less and the propeller will not revolve as rapidly, and this retardation of the propeller will be felt by the engine-governor in such a way that more steam will be admitted to the engine, and the pumping apparatus will be speeded up until it delivers the normal quantity of water—that is to say, the same quantity of water against whatever head may be required. Obviously this latter condition will be the state of affairs when the apparatus is being started up and there is no vacuum in the condenser. As soon as a vacuum forms the current of water increases and the governor will slow down the engine and the pump accordingly. The location of the propeller in a by-pass is an approved arrangement, for the reason that the size of the mechanism is reduced and the regulation of the flow of the water is permitted by the use of the common and well-known means of a gate-valve, so that the operating engineer has no new devices to learn the adjustment of, which might interfere with the proper care of the other parts of the plant. The manipulation of this ordinary gate-valve, as 12, changes and determines the amount of water, the amount when so determined being maintained constant by the automatically-operating regulating device herein described. Suppose, for instance, the gate-valve is half-open and a thousand gallons per minute are passing to the condenser under the assistance of the vacuum or otherwise and the regulator or controller is maintaining a constant speed for the engine and the pump. If then it should become desirable to supply fifteen hundred gallons of water per minute to the condenser, the gate-valve should then be opened farther. As it is opened a greater portion of the water will pass directly through the gate-valve, and as a result the regulator will slow down and the engine-governor will act to admit more steam to the engine, so as to speed up the centrifugal pump to give an increased quantity of water corresponding to the new position of the gate-valve. On the other hand, if the gate-valve be partially closed or even entirely closed the regulator will increase its speed and cause steam to be shut off from the engine, while the centrifugal pump slows down, so as to deliver and maintain a delivery of a constant quantity of water corresponding to the new position of the gate-valve. Hence in this manner the customary method of regulating the supply of water by means of a gate-valve is adhered to, and whenever the supply has once been determined it is automatically kept constant by the regulating apparatus.

Referring now to another form of controller, (represented in Fig. 4,) it will be observed that in lieu of the by-pass of the other construction I employ two pipes 24 and 25, which are connected to the water-pipe 5 on opposite sides of the gate-valve 12, which pipes lead into a diaphragm-containing case composed of two shells 27 and 28, secured together with a diaphragm 26 firmly clamped between them by means of bolts 29, said pipe 24 entering the shell 27, and thus communicating with the space on one side of diaphragm 26, and said pipe 25 entering shell 28, and thus communicating with the space on the other side of the diaphragm 26. Instead of a diaphragm a piston, which is the common equivalent thereof, may be employed. 32 represents the casing of a steam-engine valve, such as a balanced stop-valve or some other common style, there being inside of this casing a seat 33 and a steam-valve 31, operating in combination with said seat, which valve 31 is carried by a rod 30, that is fastened securely at its opposite end to the central portion of the diaphragm 26. A spiral spring 34 is coiled about the valve-rod 30 and is tensioned between a central boss 35 on shell 28 and an adjustable nut 36 on a screw-threaded portion of the valve-rod 30. Spring 34 tends to open the valve 31 and keep it open when the pressures on the opposite sides of the diaphragm 26 are equal, as would be the case ordinarily when the gate-valve 12 is wide open, for at this time the steam-valve would be wide open and the engine and centrifugal pump running at full speed. If the gate-valve 12 be partially closed, a difference in the degree of the pressures on the opposite sides of the diaphragm will immediately be created by the frictional resistance to the flow through valve 12, the greater pressure being on the side nearer to the centrifugal pump—that is to say, on the side in communication with pipe 25—and this extra pressure will operate on the diaphragm against the spring 34 and tend to close the valve 31 more or less, and thereby slow down the pump. If there should be at this time a falling off in the assistance of the vacuum in the condenser, a less quantity of water would pass through pipe 5 to the condenser, and the friction or resistance to the flow through the opening of the gate-valve 12 would be reduced, and in consequence thereof the pressure on the side of the diaphragm connected to pipe 25 would fall, so that the spring 34 will then again open the valve and the centrifugal pump will run at a speed necessary to make up for the loss of the assistance of the vacuum. In place of the gate-valve a piece of pipe of smaller diameter than the conducting-pipe may be used to cause by the frictional resistance a difference in pressure on the opposite sides of the diaphragm, or if the conducting-pipe remains the same size the pipes 24 and 25 may be connected to it at points sufficiently separated to cause appreciable difference in pressure by the frictional resistance to the flow of the water through the conducting-pipe.

The terms "controller" and "controlling device" as used in the description and claims are to be given a broad and comprehensive meaning, including many diverse forms of mechanism. They may mean the throttle of an engine, motor, or other driver, or a rheostat, controller, or variable switch of an electric motor, or a ball-governor or other speed-controlling device.

Having thus described my invention, what I claim as new, and desire to secure by Letters Patent, is—

1. The combination with a condenser, of a centrifugal pump for supplying the injection-water thereto, and means for regulating the speed of said pump to maintain the flow of a constant quantity of water.

2. The combination with a condenser in which the vacuum assists in lifting the water, of a centrifugal pump, and means for regulating the speed of said pump to maintain a flow of a constant quantity of water under varying assistance of the vacuum.

3. The combination with a condenser, of a centrifugal pump for supplying the injection-water thereto, and means acted on by the current of water for regulating the speed of said pump to keep the flow of water practically a constant quantity.

4. The combination with an elevated condenser in which the vacuum assists the flow of the injection-water, of a centrifugal pump, and means acted upon by the water-current for automatically regulating the speed of said pump so as to secure the delivery of a nearly-constant quantity of water to the condenser.

5. The combination with an elevated condenser in which the vacuum assists in lifting the water, of a centrifugal pump, and means for regulating the speed of said pump so as to secure the delivery of a constant quantity of water to the condenser, said means consisting of a device acted on by the water and connected with and controlling the speed of the pump-motor.

6. The combination with an elevated condenser in which the vacuum assists in lifting the water, of a centrifugal pump, means for conveying the water from the pump to the condenser, and means controlled by the difference in pressure due to the water-current for automatically regulating the speed of the pump so as to secure the delivery of a practically-constant quantity of water to the condenser.

7. The combination with an elevated condenser, in which the vacuum assists in lifting the water, of a centrifugal pump having a motor provided with a controller, and means consisting of a device acted on by the water and connected with said controller whereby the speed of the pump is regulated so as to secure the delivery to the condenser of a practically-constant quantity of water.

8. The combination with an elevated condenser in which the vacuum assists in lifting the water, of a centrifugal pump having a motor provided with a speed-governor, and means consisting of a device acted on by the water and connected with said governor whereby the speed of the pump is regulated so as to secure the delivery to the condenser of a practically-constant quantity of water.

9. The combination with a condenser in which the vacuum assists in lifting the water, of a centrifugal pump having a motor provided with a controller, means for conveying the water from the pump to the condenser, said means having a valve, and means controlled by the water-current, said means consisting of a device acted on by the water and connected to the controller, whereby the speed of the pump is automatically regulated to secure the delivery to the condenser of a constant quantity of water, under varying assistance of the vacuum.

10. The combination with a condenser in which the vacuum assists in lifting the water, of a centrifugal pump having a motor provided with a speed-governor, means for conveying the water from the pump to the condenser, said means having a valve, and means controlled by the water-current, said means consisting of a device acted on by the water and connected to the governor, whereby the speed of the pump is automatically regulated to secure the delivery to the condenser of a constant quantity of water, under varying assistance of the vacuum.

11. The combination with a condenser in which the vacuum assists in lifting the water, of a centrifugal pump, and means for regulating the speed of said pump consisting essentially of a diaphragm, the opposite sides of which are influenced by pressures differing on account of frictional resistance to the flow of the water-current, and means for connecting the diaphragm to the pump-motor so that its deflection may regulate the speed of the pump, whereby a flow of a nearly-constant quantity of water may be secured.

12. The combination with a condenser in which the vacuum assists in lifting the water, of a centrifugal pump, and means for regulating the speed of said pump consisting essentially of a diaphragm, the opposite sides of which are influenced by a difference in pressure varying on account of change of frictional resistance of the water-current arising from changes in flow due to the varying assistance of the vacuum or change of suction-level, and means for connecting the diaphragm to regulate speed of the pump whereby a flow of a nearly-constant quantity of water may be secured.

13. The combination with an elevated condenser in which the vacuum assists in lifting the water, of a centrifugal pump having a motor provided with a speed-governor, and means consisting of a rotary device or propeller acted on by the water and connected with said governor whereby the speed of the pump is regulated so as to secure the delivery to the condenser of a practically-constant quantity of water.

14. The combination with an elevated condenser in which the vacuum assists in lifting the water, of a centrifugal pump having a motor provided with a speed-governor, and means consisting of a propeller device having suitable blades or vanes acted on by the water and connected with said governor whereby the speed of the pump is regulated so as to secure the delivery to the condenser of a practically-constant quantity of water.

Signed at New York city this 20th day of November, 1902.

LOUIS R. ALBERGER.

Witnesses:
JOHN H. HAZELTON,
A. E. SAMUELS.